US012686221B2

(12) United States Patent
Onishi et al.

(10) Patent No.: US 12,686,221 B2
(45) Date of Patent: Jul. 21, 2026

(54) RECORDING DEVICE AND WASHING MECHANISM

(71) Applicant: SEIKO EPSON CORPORATION, Tokyo (JP)

(72) Inventors: Yasunori Onishi, Shiojiri (JP); Shigenori Nakagawa, Bangalore (IN); Kazutoshi Fujishima, Azumino (JP); Katsumasa Tanaka, Ina (JP); Takahiro Matsuzaki, Shiojiri (JP); Shuhei Nishizawa, Matsumoto (JP); Kohei Yamada, Shiojiri (JP); Tsukasa Eguchi, Matsumoto (JP); Atsushi Matsuo, Azumino (JP); Toshiyuki Nozawa, Okaya (JP)

(73) Assignee: SEIKO EPSON CORPORATION, Tokyo (JP)

(*) Notice: Subject to any disclaimer, the term of this patent is extended or adjusted under 35 U.S.C. 154(b) by 196 days.

(21) Appl. No.: 18/762,940

(22) Filed: Jul. 3, 2024

(65) Prior Publication Data

US 2025/0010646 A1 Jan. 9, 2025

(30) Foreign Application Priority Data

Jul. 3, 2023 (JP) ................................ 2023-109151

(51) Int. Cl.
*B41J 2/17* (2006.01)
*B41J 11/00* (2006.01)
*B41J 29/17* (2006.01)

(52) U.S. Cl.
CPC ............ *B41J 29/17* (2013.01); *B41J 11/007* (2013.01)

(58) Field of Classification Search
CPC ........................................................ B41J 29/17
See application file for complete search history.

(56) References Cited

U.S. PATENT DOCUMENTS 7,182,420 B2 * 2/2007 Nakazawa ............ B41J 2/1707 347/7
2008/0218550 A1 9/2008 Tsuji et al.
2016/0355037 A1 * 12/2016 Yamaguchi ............. B41J 13/12

FOREIGN PATENT DOCUMENTS

JP 2004181674 A * 7/2004
JP 2008-213394 A 9/2008

* cited by examiner

*Primary Examiner* — Sharon Polk
(74) *Attorney, Agent, or Firm* — Dority & Manning, P.A.

(57) ABSTRACT

A recording device 11 includes a transport belt 25; a recording section 12 configured to record an image on a medium 99 by ejecting pigment ink onto the medium 99; and a washing mechanism 31 configured to wash the transport belt 25 with washing liquid, wherein the washing mechanism 31 includes a storage section 35 configured to store washing liquid, a first detection section 59 configured to detect an ink concentration of black ink contained in washing liquid, a second detection section 60 configured to detect an ink concentration of pigment ink contained in the washing liquid, and a washing control section 65, the second detection section 60 detects the ink concentration of the pigment ink, and the washing control section 65 determines a threshold based on the ink concentration of the black ink detected, and discharges washing liquid from the storage section 35 based on the threshold.

9 Claims, 8 Drawing Sheets

RECORDING DEVICE AND WASHING MECHANISM

The present application is based on, and claims priority from JP Application Serial Number 2023-109151, filed Jul. 3, 2023, the disclosure of which is hereby incorporated by reference herein in its entirety.

BACKGROUND

1. Technical Field

The present disclosure relates to a recording device and a washing mechanism.

2. Related Art

JP-A-2008-213394 describes a recording device that includes a washing mechanism that washes, with washing liquid, a transport belt that transports a medium. In the washing mechanism, when the transport belt is washed, ink is mixed into washing liquid. The washing mechanism detects an ink concentration of washing liquid. When an ink concentration of washing liquid is large, the washing mechanism discharges the washing liquid.

The recording device described in JP-A-2008-213394 detects an ink concentration based on the transmitted light amount of washing liquid. However, the transmitted light amount varies depending on the color of ink contained in washing liquid. For example, when washing liquid contains black ink, the transmitted light amount is likely to be smaller than when washing liquid does not contain black ink. Therefore, the recording device may not be able to appropriately discharge washing liquid based on an ink concentration.

SUMMARY

A recording device that overcomes the above-described problem includes a transport belt configured to transport a medium; a recording section configured to record an image on a medium transported by the transport belt by ejecting pigment ink onto the medium; and a washing mechanism configured to wash the transport belt with washing liquid, wherein the pigment ink includes black ink and ink other than the black ink, the washing mechanism includes a storage section configured to store washing liquid, a first detection section configured to detect an ink concentration of the black ink contained in washing liquid stored in the storage section, a second detection section configured to detect an ink concentration of the pigment ink contained in the washing liquid stored in the storage section, and a washing control section, the second detection section detects the ink concentration of the pigment ink by receiving light scattered in the washing liquid, and the washing control section determines a threshold based on the ink concentration of the black ink detected by the first detection section, and discharges washing liquid from the storage section when the ink concentration of the pigment ink detected by the second detection section is equal to or larger than the threshold.

A washing mechanism that overcomes the above-described problem for washing, with washing liquid, a transport belt that transports a medium on which an image is recorded by ejecting pigment ink containing black ink and ink other than the black ink, the washing mechanism includes a storage section configured to store washing liquid; a first detection section configured to detect an ink concentration of the black ink contained in washing liquid stored in the storage section; a second detection section configured to detect an ink concentration of the pigment ink contained in washing liquid stored in the storage section; and a washing control section, wherein the second detection section detects the ink concentration of the pigment ink by receiving light scattered in washing liquid and the washing control section determines a threshold based on the ink concentration of the black ink detected by the first detection section, and discharges washing liquid from the storage section when the ink concentration of the pigment ink detected by the second detection section is equal to or larger than the threshold.

DESCRIPTION OF EMBODIMENTS

Hereinafter, an embodiment of a recording device including a washing mechanism will be described with reference to the drawings. The recording device is, for example, an inkjet type printer that records images such as characters and photographs by ejecting pigment ink onto a medium such as a fabric or a paper sheet. Pigment ink is ink in which a pigment is dispersed in a solvent. Pigment ink includes black ink and ink other than black ink. Pigment ink includes, for example, cyan, yellow, magenta, red, orange, green, and light black inks in addition to black.

Recording Device

Figure 1:
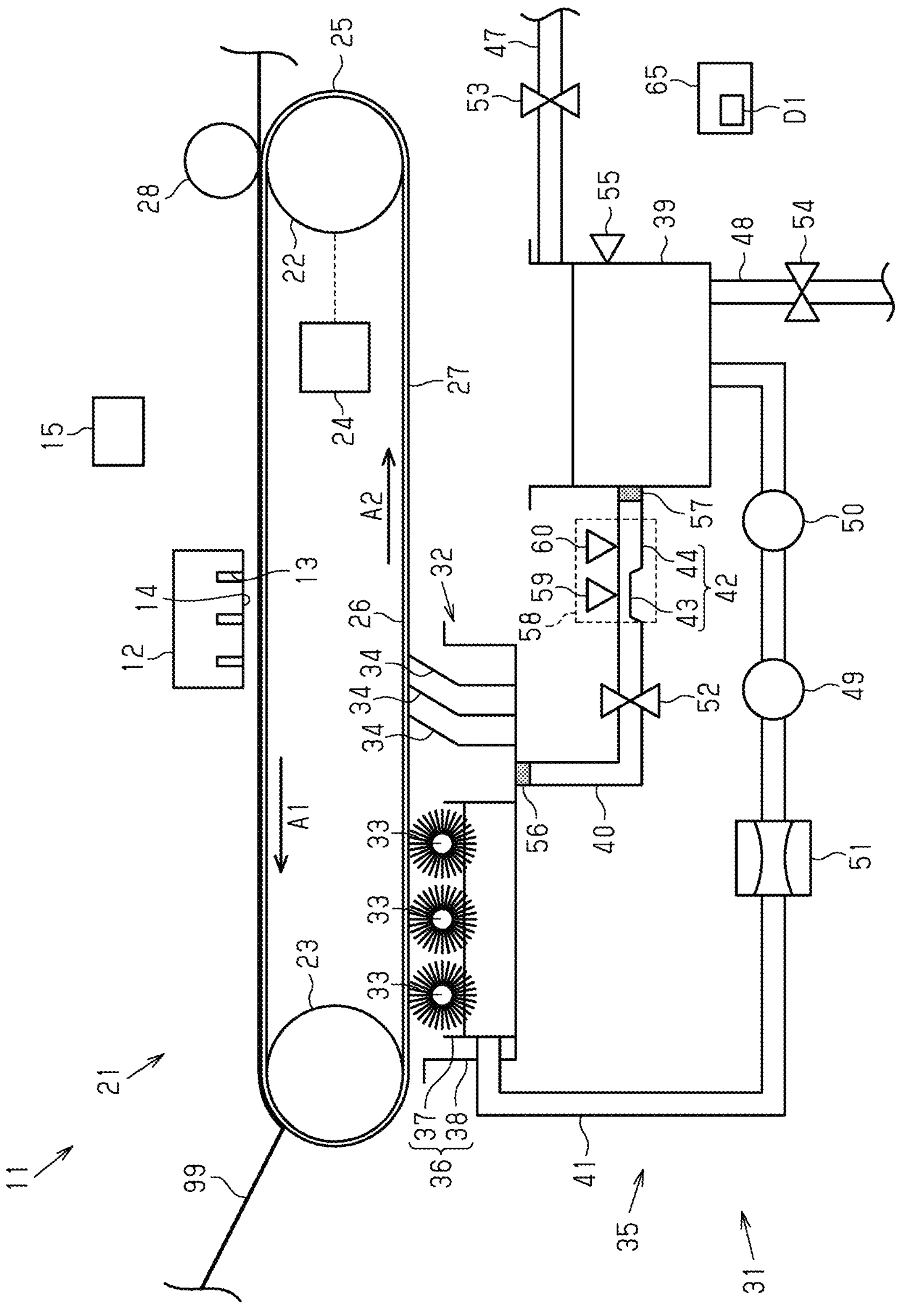
FIG. 1 is a schematic diagram showing an embodiment of a recording device including a washing mechanism.

As shown in FIG. 1, a recording device 11 includes a recording section 12. The recording section 12 is configured to eject pigment ink onto a medium 99. As a result, the recording section 12 records an image on the medium 99. The recording section 12 is a head. The recording section 12 includes a nozzle surface 14 in which one or more nozzles 13 are opened. The recording section 12 ejects pigment ink from the nozzles 13. The recording section 12 may be a serial head that scans the medium 99. The recording section 12 may be a line head capable of ejecting pigment ink all at once across the width of the medium 99.

The recording device 11 includes a recording control section 15. The recording control section 15 controls the recording section 12. The recording control section 15 may control a transport section 21 (to be described later).

The recording control section 15 may be configured by one or more processors that execute various processes in accordance with a computer program. The recording control section 15 may be configured by one or more dedicated hardware circuits such as an application specific integrated circuit that executes at least a part of various processes. The recording control section 15 may be configured by a circuit including a combination of a processor and a hardware circuit. The processor includes a CPU and memories such as a RAM and a ROM. The memory stores program codes or commands configured to cause the CPU to execute processes. Memory, or computer readable medium, includes any readable medium that can be accessed by a general purpose or special purpose computer.

The recording device 11 includes the transport section 21. The transport section 21 is configured to transport the medium 99. In a process of transporting the medium 99 by the transport section 21, liquid is ejected from the recording section 12 onto the medium 99.

The transport section 21 is configured to transport the medium 99 in a transport direction A1. The transport section 21 includes a plurality of transport rollers. For example, the transport section 21 includes a first transport roller 22 and a second transport roller 23. The first transport roller 22 is positioned upstream of the recording section 12 in the transport direction A1. The second transport roller 23 is positioned downstream of the recording section 12 in the transport direction A1.

The transport section 21 includes a drive source 24. The drive source 24 is, for example, a motor. The drive source 24 is connected to at least one transport roller of the plurality of transport rollers. For example, the drive source 24 is connected to the first transport roller 22. The first transport roller 22 is rotated by the drive source 24.

The transport section 21 includes a transport belt 25. The transport belt 25 is wound around a plurality of transport rollers. For example, the transport belt 25 is wound around the first transport roller 22 and the second transport roller 23. The transport belt 25 rotates along the first transport roller 22 and the second transport roller 23 when the drive source 24 rotates the first transport roller 22. In FIG. 1, the transport belt 25 rotates counterclockwise. As a result, the transport belt 25 transports the medium 99. The transport belt 25 supports the medium 99 on which an image is recorded by the recording section 12.

The transport belt 25 includes a portion that moves in the transport direction A1 and a portion that moves in an opposite direction A2 opposite to the transport direction A1. The transport belt 25 transports the medium 99 by a portion that moves in the transport direction A1. A portion that moves in the opposite direction A2 is washed by a washing mechanism 31 (to be described later).

The transport belt 25 includes an inner peripheral surface 26 and an outer peripheral surface 27. The inner peripheral surface 26 is a surface that is in contact with the plurality of transport rollers. For example, the inner peripheral surface 26 is in contact with the first transport roller 22 and the second transport roller 23. The outer peripheral surface 27 is a surface in contact with the medium 99. Therefore, the outer peripheral surface 27 is a surface that supports the medium 99. The outer peripheral surface 27 faces the nozzle surface 14.

The transport belt 25 is configured to be able to adhere the medium 99. Specifically, the medium 99 is adhered to the outer peripheral surface 27. As a result, the medium 99 is transported in a stable posture. For example, the transport belt 25 is an adhesive belt coated with an adhesive. An adhesive is applied to the outer peripheral surface 27. In this case, the medium 99 is adhered to the outer peripheral surface 27 by the adhesive. The medium 99 may be adhered to the outer peripheral surface 27 by, for example, a suction force, an electrostatic force, an intermolecular force, or the like, without being limited to an adhesive. After an image is recorded on the medium 99 by the recording section 12, the medium 99 is peeled off from the outer peripheral surface 27 by being pulled by, for example, another device. The transport section 21 may include a peel off section for peeling off the medium 99 from the outer peripheral surface 27. In this case, the peel off section is, for example, a roller around which the medium 99 is wound.

The transport section 21 may include a pressing section 28. The pressing section 28 is configured to press the medium 99 against the transport belt 25. For example, the pressing section 28 is a roller. The medium 99 is adhered to the outer peripheral surface 27 by the pressing section 28 pressing the medium 99 against the transport belt 25.

In the transport belt 25, as the recording section 12 records an image on the medium 99, pigment ink may deposit to the outer peripheral surface 27. When the transport belt 25 continues to transport the medium 99 in a state in which pigment ink deposits to the outer peripheral surface 27, the medium 99 may be contaminated.

The recording device 11 includes a washing mechanism 31. The washing mechanism 31 is configured to wash the transport belt 25 with washing liquid. Specifically, the washing mechanism 31 washes the outer peripheral surface 27 with washing liquid. The washing mechanism 31 removes pigment ink depositing to the outer peripheral surface 27 with washing liquid. Pigment ink is easily removed from the transport belt 25 by washing liquid. For example, washing liquid is water.

Washing Mechanism

The washing mechanism 31 includes a washing section 32. The washing section 32 washes the transport belt 25 with washing liquid. The washing section 32 washes the transport belt 25 by being in contact with the transport belt 25. Specifically, the washing section 32 is in contact with the outer peripheral surface 27. The washing section 32 is in contact with a portion of the transport belt 25 which is positioned in the opposite direction A2. That is, the washing section 32 is in contact with the transport belt 25 after the medium 99 is peeled off.

The washing section 32 includes one or more washing rollers 33. For example, the washing section 32 includes three washing rollers 33. The washing rollers 33 are in contact with the transport belt 25 while rotating. The washing rollers 33 may be driven to rotate relative to the transport belt 25. That is, the washing rollers 33 may be driven to rotate clockwise in FIG. 1. The washing rollers 33 may drive to rotate so as to resist the rotation of the transport belt 25. That is, the washing rollers 33 may rotate counterclockwise in FIG. 1. In this case, since the contact resistance between the washing rollers 33 and the transport belt 25 increases, pigment ink is easily removed from the transport belt 25.

The washing rollers 33 are in contact with the transport belt 25 in a wet state with washing liquid. As a result, the transport belt 25 is wetted with washing liquid, so that pigment ink is easily removed from the transport belt 25. The washing rollers 33 are, for example, brush rollers. The washing rollers 33 may be sponge rollers.

The washing section 32 includes one or more washing blades 34. For example, the washing section 32 includes three washing blades 34. The washing blades 34 are in contact with the transport belt 25 wet with washing liquid. The washing blades 34 are in contact with the outer peripheral surface 27 wet with washing liquid. The washing blades 34 scrape pigment ink together with washing liquid depositing to the transport belt 25. The washing blades 34 are in contact with the transport belt 25 after the washing rollers 33 are in contact with the transport belt 25. Therefore, the washing blades 34 are positioned in the opposite direction A2 from the washing rollers 33.

The washing mechanism 31 includes a storage section 35. The storage section 35 is configured to store washing liquid. The storage section 35 holds the washing section 32. The washing section 32 washes the transport belt 25 using washing liquid stored in the storage section 35. Washing liquid stored in the storage section 35 is gradually contaminated as the washing section 32 washes the transport belt 25. Therefore, the washing mechanism 31 needs to appropriately replace washing liquid stored in the storage section 35.

The storage section 35 includes a washing tank 36. The washing tank 36 is a tank that stores washing liquid used by the washing section 32. The washing tank 36 is positioned so as to face the outer peripheral surface 27. The washing tank 36 holds the washing section 32.

The washing tank 36 includes a dipping tank 37. The dipping tank 37 is a tank that stores a predetermined amount of washing liquid. The dipping tank 37 holds the washing rollers 33. The dipping tank 37 holds the washing rollers 33 so that the washing rollers 33 are dipped in stored washing liquid. As the washing rollers 33 wash the transport belt 25, pigment ink flows into the dipping tank 37.

The washing tank 36 includes a support tank 38. The support tank 38 supports the dipping tank 37. Specifically, the support tank 38 accommodates the dipping tank 37. The support tank 38 receives washing liquid overflowing from the dipping tank 37.

The support tank 38 supports the washing blades 34. The support tank 38 receives washing liquid flowing down along the washing blades 34. As the washing blades 34 wash the transport belt 25, pigment ink flows into the support tank 38.

The storage section 35 includes an accommodation tank 39. The accommodation tank 39 is a tank connected to the washing tank 36. The accommodation tank 39 stores washing liquid after being used by the washing section 32 and washing liquid before being used by the washing section 32.

The storage section 35 includes a plurality of connection flow paths. For example, the storage section 35 includes a first connection flow path 40 and a second connection flow path 41. The connection flow paths are flow paths connected to the washing tank 36 and the accommodation tank 39. Specifically, the first connection flow path 40 is connected to the support tank 38 and the accommodation tank 39. The second connection flow path 41 is connected to the dipping tank 37 and the accommodation tank 39. Washing liquid flows from the washing tank 36 to the accommodation tank 39 through the first connection flow path 40. Washing liquid flows from the accommodation tank 39 to the washing tank 36 through the second connection flow path 41. In this way, washing liquid is circulated between the washing tank 36 and the accommodation tank 39 in the storage section 35. As a result, the concentration of pigment ink contained in washing liquid is likely to be uniform.

The storage section 35 includes a detection flow path 42. Washing liquid flows through the detection flow path 42. In the detection flow path 42, the ink concentration is detected by a detection unit 58 (to be described later). The detection unit 58 is attached to the detection flow path 42. The detection flow path 42 may be the same flow path as the connection flow path, or may be a flow path different from the connection flow path. For example, the detection flow path 42 constitutes a part of the first connection flow path 40. The detection flow path 42 may be a bypass flow path attached to the connection flow path.

Figure 2:
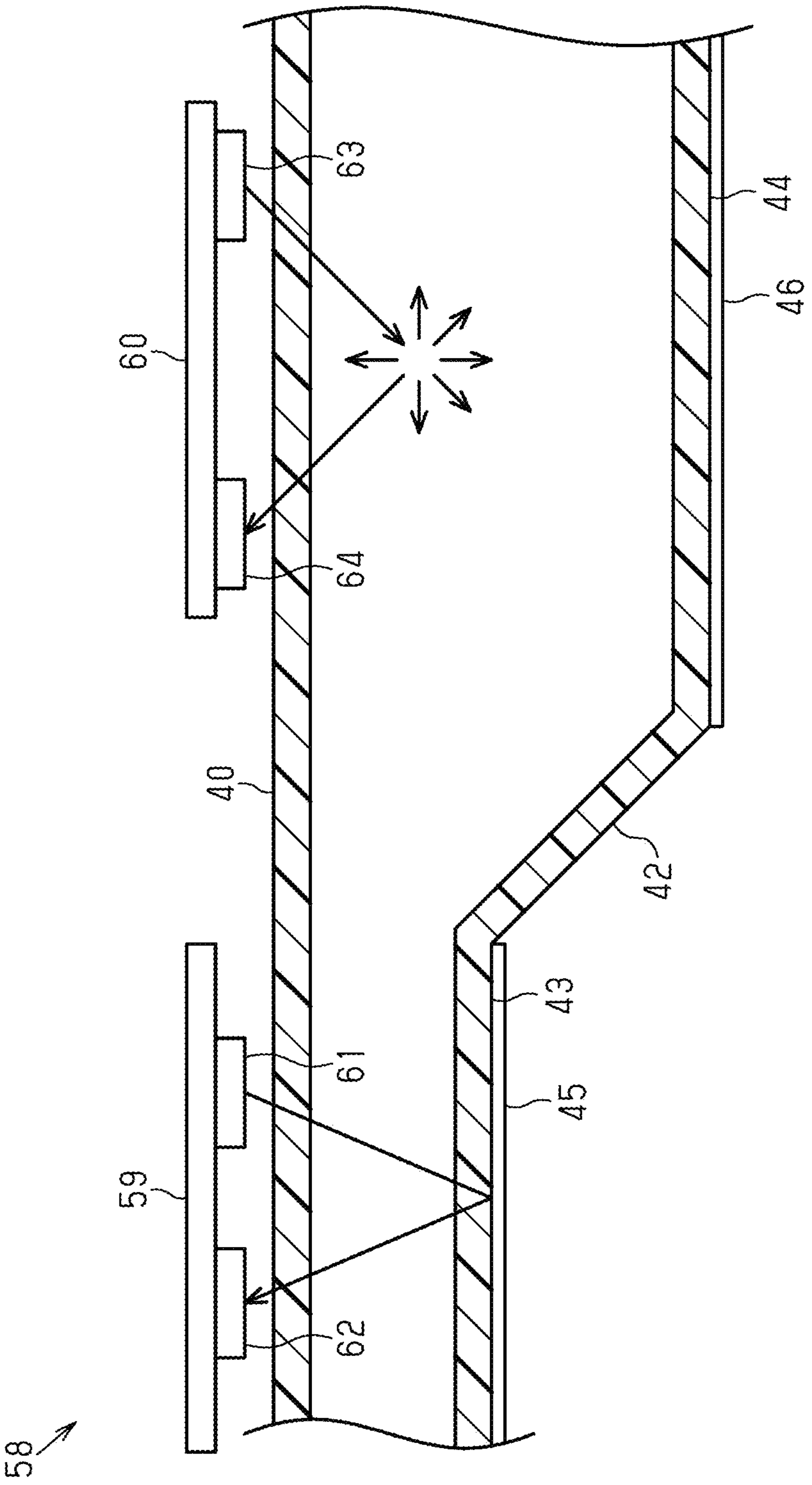
FIG. 2 is a schematic diagram showing a detection unit.

As shown in FIG. 2, the detection flow path 42 includes a first flow path portion 43 and a second flow path portion 44. The first flow path portion 43 is a flow path portion in which the ink concentration is detected by a first detection section 59 (to be described later). The second flow path portion 44 is a flow path portion in which the ink concentration is detected by a second detection section 60 (to be described later). For example, the width of the first flow path portion 43 is smaller than the width of the second flow path portion 44.

The detection flow path 42 may include a reflection sheet 45. The reflection sheet 45 is a sheet that reflects light. For example, the reflection sheet 45 reflects infrared light. The reflection sheet 45 is, for example, a white or silver resin sheet. The reflection sheet 45 is attached to the first flow path portion 43. For example, the reflection sheet 45 is attached to an outer peripheral surface of the first flow path portion 43.

The detection flow path 42 may include a light absorption sheet 46. The light absorption sheet 46 is a sheet that absorbs light. For example, the light absorption sheet 46 absorbs infrared light. The light absorption sheet 46 is, for example, a sheet coated with carbon. The light absorption sheet 46 is attached to the second flow path portion 44. For example, the light absorption sheet 46 is attached to an outer peripheral surface of the second flow path portion 44.

As shown in FIG. 1, the washing mechanism 31 includes a supply flow path 47. The supply flow path 47 is a flow path through which washing liquid is supplied. New washing liquid is supplied to the washing mechanism 31 through the supply flow path 47. The supply flow path 47 is connected to the storage section 35. For example, the supply flow path 47 is connected to the accommodation tank 39. The supply flow path 47 is connected to, for example, a water supply. When washing liquid in the storage section 35 is reduced due to evaporation of washing liquid, discharge of washing liquid, or the like, washing liquid is supplied from the supply flow path 47 to the storage section 35.

The washing mechanism 31 includes a discharge flow path 48. The discharge flow path 48 is a flow path through which washing liquid is discharged. Washing liquid is discharged from the washing mechanism 31 through the discharge flow path 48. For example, the discharge flow path 48 is connected to the accommodation tank 39. The discharge flow path 48 is connected to, for example, a processing device that processes waste liquid, a waste liquid tank that stores waste liquid, and the like. When washing liquid is contaminated by pigment ink, washing liquid is discharged from the storage section 35 through the discharge flow path 48.

The washing mechanism 31 includes a pump 49. The pump 49 circulates washing liquid in the storage section 35. The pump 49 circulates washing liquid between the washing tank 36 and the accommodation tank 39 through the first connection flow path 40 and the second connection flow path 41. For example, the pump 49 is positioned in the second connection flow path 41. The pump 49 may be positioned in the first connection flow path 40.

The washing mechanism 31 includes a flow meter 50. The flow meter 50 measures the flow amount of washing liquid flowing in the storage section 35. The flow meter 50 measures the flow amount of washing liquid circulating between the washing tank 36 and the accommodation tank 39. The washing mechanism 31 controls the pump 49 based on a measurement result of the flow meter 50. For example, the flow meter 50 is positioned in the second connection flow path 41. Specifically, the flow meter 50 is positioned between the pump 49 and the accommodation tank 39 in the second connection flow path 41. The flow meter 50 may be positioned in the first connection flow path 40.

The washing mechanism 31 includes a constant flow valve 51. The constant flow valve 51 is configured to maintain a constant flow amount of washing liquid flowing in the storage section 35. The constant flow valve 51 is a so-called throttle valve. The constant flow valve 51 maintains a constant flow amount of washing liquid circulating between the washing tank 36 and the accommodation tank 39. For example, the constant flow valve 51 is positioned in the second connection flow path 41. Specifically, the constant flow valve 51 is positioned between the pump 49 and the washing tank 36 in the second connection flow path 41. The constant flow valve 51 may be positioned in the first connection flow path 40.

The washing mechanism 31 includes one or more opening and closing valves. For example, the washing mechanism 31 includes a first opening and closing valve 52, a second opening and closing valve 53, and a third opening and closing valve 54. The opening and closing valve is, for example, a solenoid valve. The first opening and closing valve 52 is positioned in the first connection flow path 40. By opening the first opening and closing valve 52, washing liquid can flow from the washing tank 36 to the accommodation tank 39. The second opening and closing valve 53 is positioned in the supply flow path 47. By opening the second opening and closing valve 53, washing liquid is supplied to the storage section 35. The third opening and closing valve 54 is positioned in the discharge flow path 48. By opening the third opening and closing valve 54, washing liquid is discharged from the storage section 35.

The washing mechanism 31 may include a liquid amount sensor 55. The liquid amount sensor 55 is a sensor that measures the amount of washing liquid stored in the storage section 35. For example, the liquid amount sensor 55 measures the amount of washing liquid accommodated in the accommodation tank 39. The washing mechanism 31 can maintain the amount of washing liquid stored in the storage section 35 at a constant amount by the liquid amount sensor 55. For example, when the amount of washing liquid stored in the accommodation tank 39 is large, the washing mechanism 31 discharges washing liquid through the discharge flow path 48. When the amount of washing liquid stored in the accommodation tank 39 is small, the washing mechanism 31 supplies washing liquid through the supply flow path 47.

The washing mechanism 31 may include one or more filters. The washing mechanism 31 includes a washing filter 56 and an accommodation filter 57. The filters collect dust, fluff, and the like in washing liquid. The washing filter 56 is attached to the first connection flow path 40. Specifically, the washing filter 56 is positioned at an end section of the first connection flow path 40 which is attached and connected to the washing tank 36. The washing filter 56 collects foreign matter from washing liquid flowing from the washing tank 36 to the accommodation tank 39. The accommodation filter 57 is attached to the first connection flow path 40. Specifically, the accommodation filter 57 is positioned at an end section connected to the accommodation tank 39 in the first connection flow path 40. The accommodation filter 57 collects foreign matter from washing liquid flowing from the washing tank 36 to the accommodation tank 39.

The washing mechanism 31 includes the detection unit 58. The detection unit 58 is configured to detect the ink concentration of pigment ink contained in washing liquid stored in the storage section 35. The detection unit 58 detects the ink concentration of washing liquid flowing through the detection flow path 42. The washing mechanism 31 discharges washing liquid when the ink concentration of pigment ink contained in washing liquid is large. When the ink concentration of pigment ink contained in washing liquid increases, the washing ability of the washing mechanism 31 decreases. By discharging washing liquid when the ink concentration of pigment ink contained in washing liquid is large, the amount of washing liquid used is reduced compared to a configuration in which washing liquid is continuously supplied.

In the storage section 35, pigment constituting pigment ink is dispersed in washing liquid. The detection unit 58 detects the ink concentration of pigment ink by detecting pigment dispersed in washing liquid. The detection unit 58 optically detects pigment dispersed in washing liquid. Methods for optically detecting pigment dispersed in washing liquid include a transmission method and a scattering method. The transmission method is a method of detecting pigment based on the amount of light transmitted through washing liquid. That is, the transmission method is a method using the fact that pigment absorbs light. The scattering method is a method of detecting pigment based on the amount of scattered light scattered by washing liquid. That is, the scattering method is a method using the fact that pigment reflects light.

Figure 3:
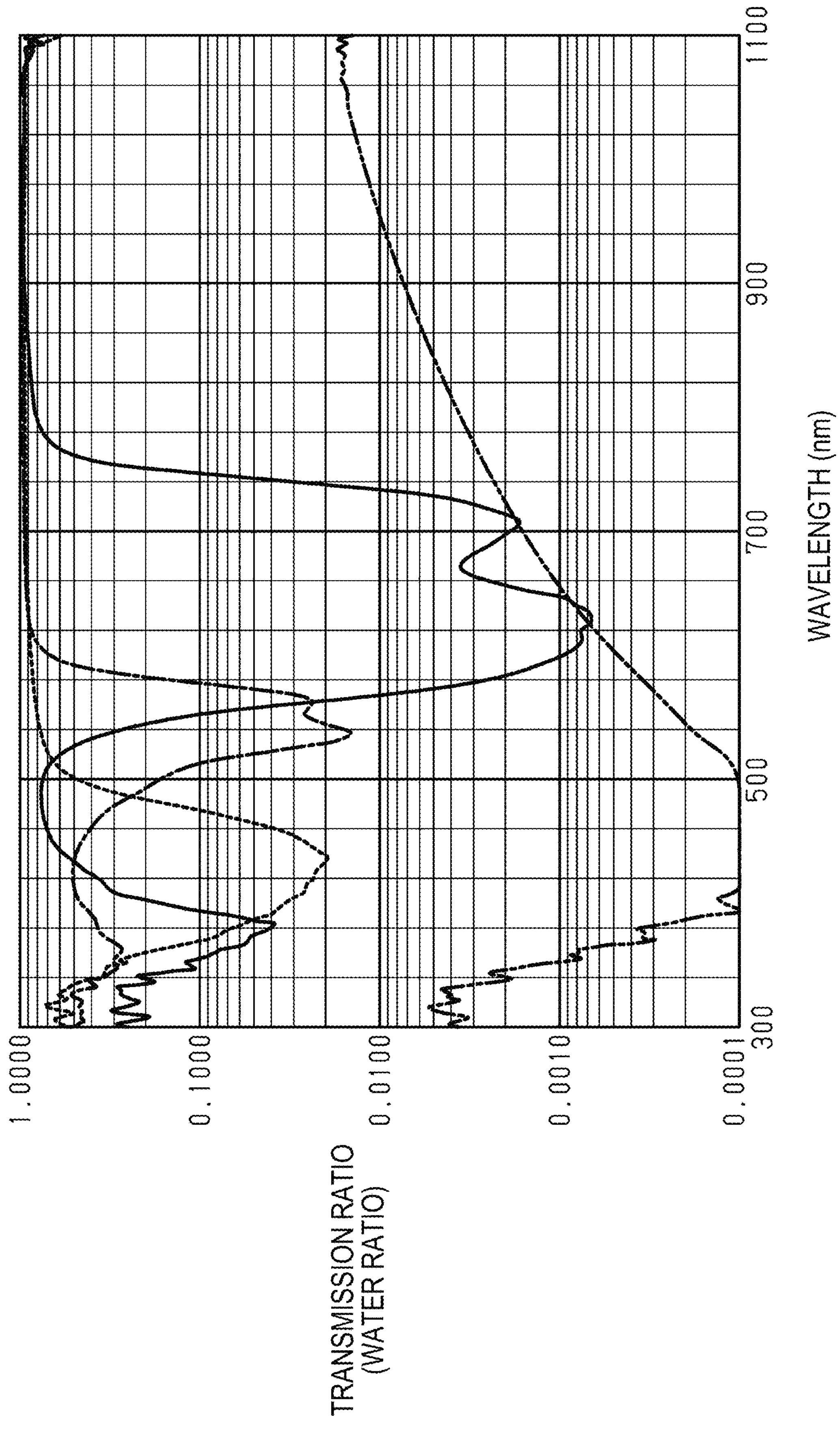
FIG. 3 is a graph showing the wavelength of light and the transparency of pigment ink.
Figure 4:
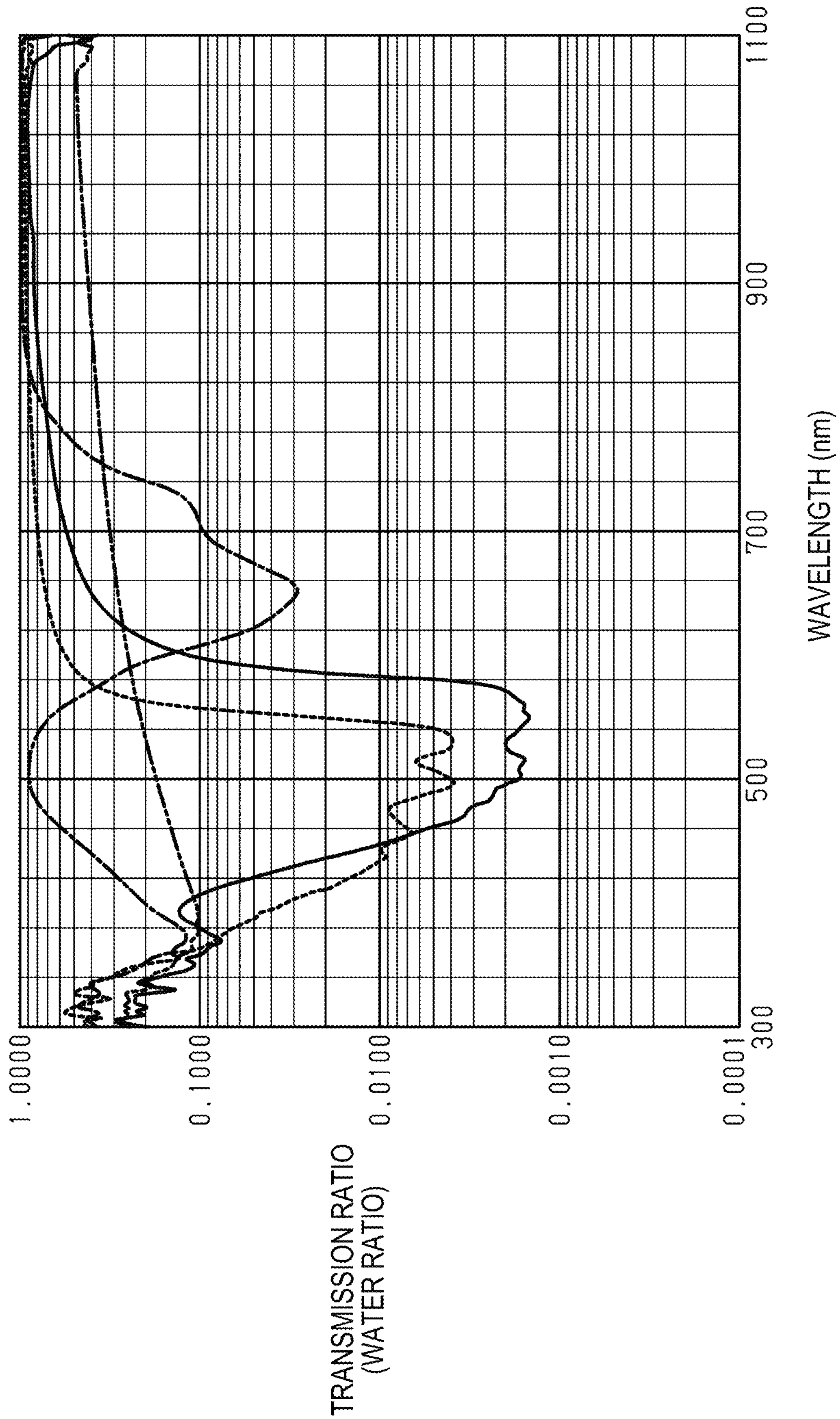
FIG. 4 is a graph showing the wavelength of light and the transparency of pigment ink.

As shown in FIGS. 3 and 4, in pigment ink, the transparency with respect to the wavelength of light, that is, the absorbency is different depending on the color of pigment ink. The graphs shown in FIG. 3 and FIG. 4 show the transparency when washing liquid containing ink of a single color is irradiated with light. Black ink indicated by the two dot chain line in FIG. 3 shows absorbency regardless of the wavelength of light. Specifically, black ink shows absorbency with respect to light having the wavelength of 300 nm to 1100 nm. Cyan ink indicated by the solid line in FIG. 3 shows absorbency with respect to light having the wavelength of 540 nm to 740 nm. Magenta ink indicated by the one dot chain line in FIG. 3 shows absorbency with respect to light having the wavelength of 500 nm to 580 nm. Yellow ink indicated by the broken line in FIG. 3 shows absorbency with respect to light having the wavelength of 340 nm to 500 nm. Red ink indicated by the solid line in FIG. 4 shows absorbency with respect to light having the wavelength of 300 nm to 620 nm. Orange ink indicated by the broken line in FIG. 4 shows absorbency with respect to light having the wavelength of 300 nm to 580 nm. Green ink indicated by the one dot chain line in FIG. 4 shows absorbency with respect to light having the wavelength of 580 nm to 780 nm. Light black ink indicated by the two dot chain line in FIG. 4 shows absorbency with respect to light having the wavelength of 300 nm to 780 nm.

The larger the ink concentration of pigment ink is, the smaller the amount of light transmitted through washing liquid is. On the other hand, the transmitted light amount varies depending on the color of pigment ink scattered in washing liquid. This is because the wavelength region of the light showing absorbency varies depending on the color of pigment ink. That is, when washing liquid is irradiated with light of a predetermined wavelength, the ink concentration of the color showing absorbency with respect to the light can be detected, but the ink concentration of the color not showing absorbency with respect to the light cannot be detected. Therefore, it is difficult to detect the ink concentration of pigment ink for washing liquid containing pigments of a plurality of colors based on the transmitted light amount.

In contrast to a transmission method, a scattering method uses light in a wavelength range in which pigment hardly absorbs, whereby the ink concentration of pigment ink can be detected relatively independently of the color. For example, by using infrared light having the wavelength of 800 nm or more, the detection unit 58 can detect the ink concentration of pigment ink in washing liquid containing pigments of a plurality of colors. Therefore, the detection unit 58 detects the ink concentration of pigment ink based on the scattered light amount.

The larger the ink concentration of pigment ink is, the larger the scattered light amount is. On the other hand, the scattered light amount varies depending on the color of pigment ink scattered in washing liquid. Specifically, when the ink concentration of black ink contained in washing liquid is large, the scattered light amount becomes small despite the large ink concentration of pigment ink. This is because black ink shows absorbency not only for visible light but also for infrared light.

Figure 5:
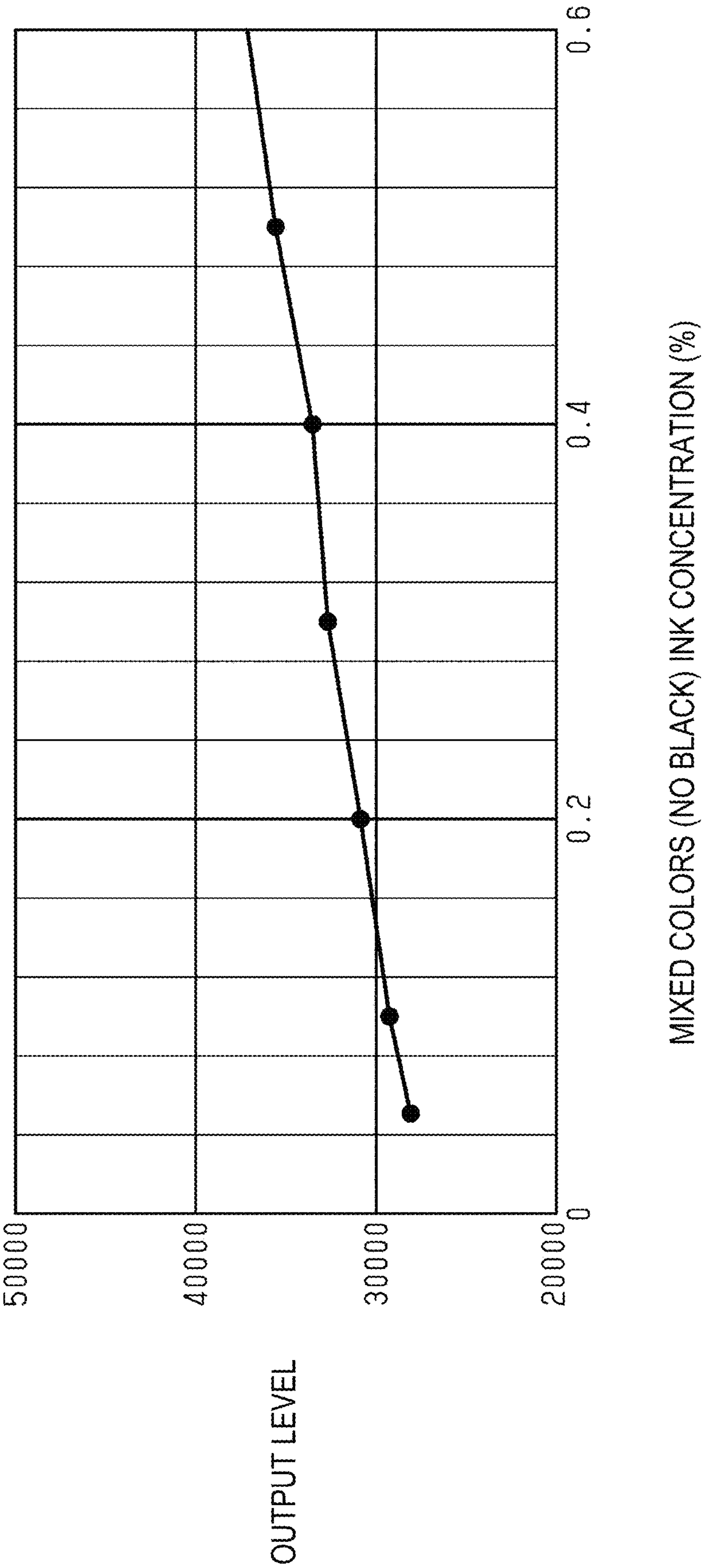
FIG. 5 is a graph showing the ink concentration of pigment ink containing no black ink and output level.

As shown in FIG. 5, when black ink is not contained in washing liquid, the ink concentration and the output level are in a proportional relationship. The output level is a level indicated by the scattered light amount. That is, the larger the ink concentration of pigment ink is, the larger the scattered light amount is.

Figure 6:
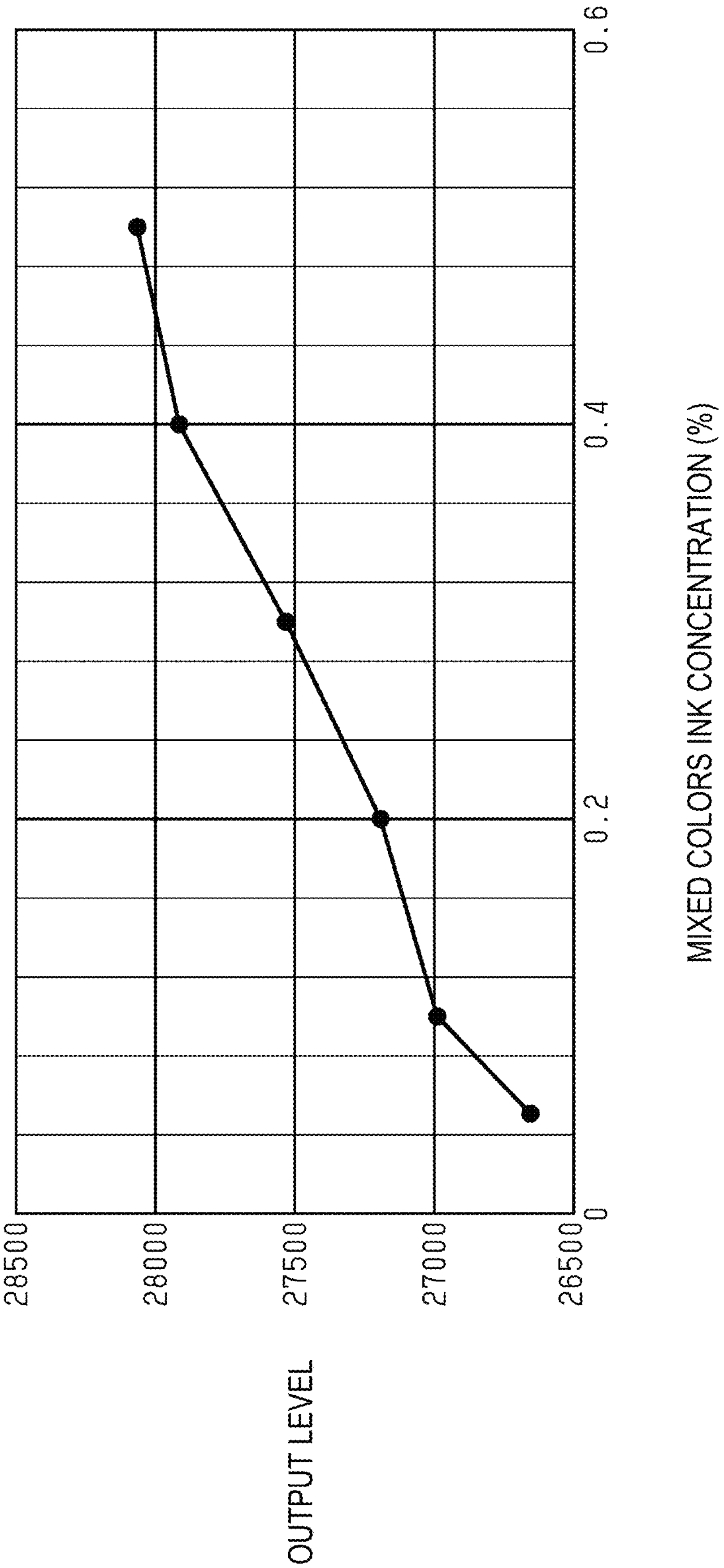
FIG. 6 is a graph showing the ink concentration of pigment ink containing black ink and output level.

As shown in FIG. 6, when black ink is contained in washing liquid, the ink concentration and the output level are in a proportional relationship as in a case where black ink is not contained. That is, the larger the ink concentration of pigment ink is, the larger the scattered light amount is. On the other hand, when black ink is contained in washing liquid, the output level is lower with respect to the ink concentration, compared to a case where black ink is not contained.

Figure 7:
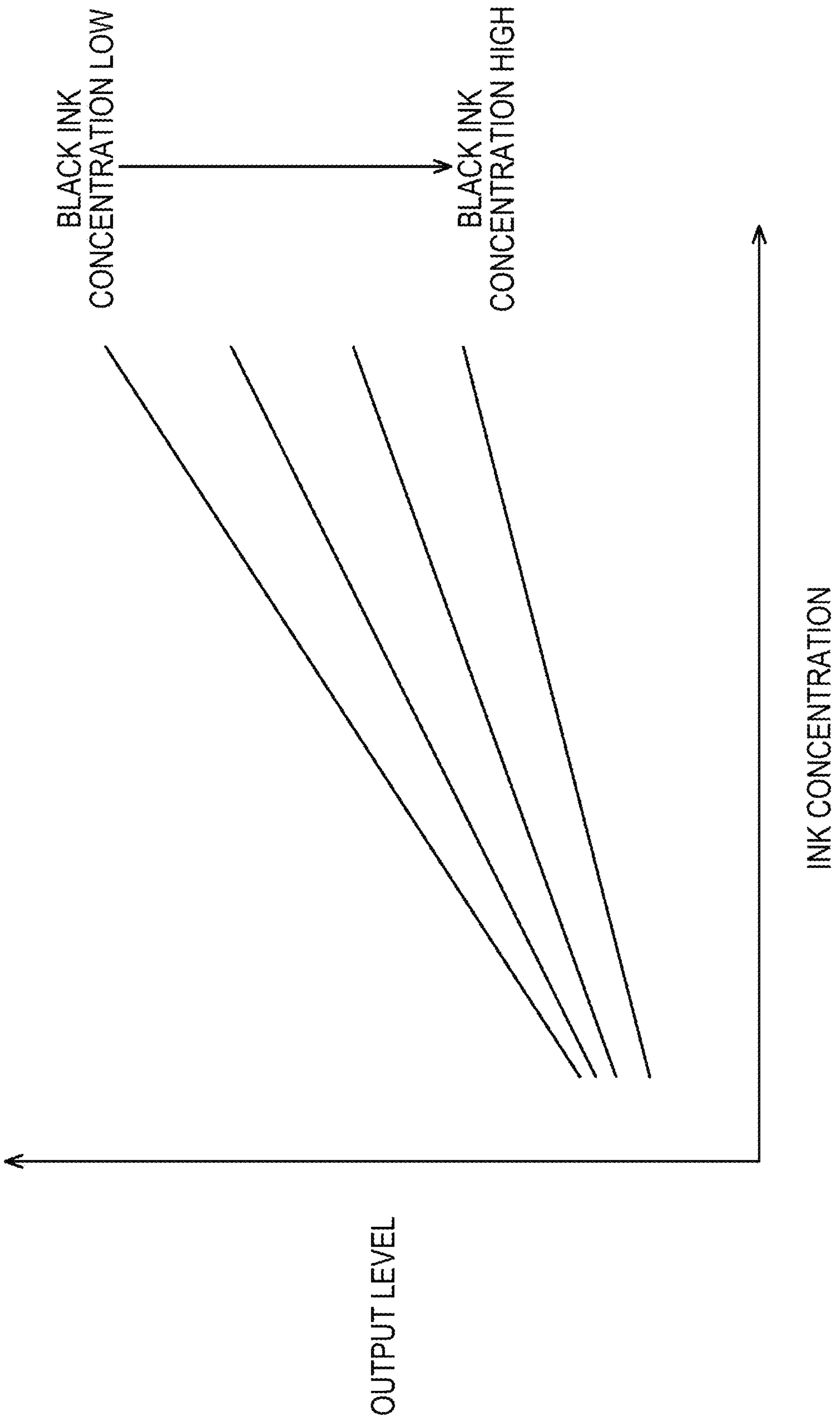
FIG. 7 is a graph showing output level that varies depending on the ink concentration of black ink and the ink concentration of pigment ink.

As shown in FIG. 7, the larger the ink concentration of black ink contained in washing liquid is, the lower the output level is. That is, even when the ink concentration of pigment ink contained in washing liquid is the same, the scattered light amount varies depending on the ink concentration of black ink. Therefore, it is difficult to uniquely determine the ink concentration of pigment ink based on the scattered light amount.

The ink concentration of black ink determines the correspondence relationship between the ink concentration of pigment ink and the scattered light amount. That is, the ink concentration of pigment ink is determined from the scattered light amount based on the ink concentration of black ink. Therefore, the detection unit 58 detects the ink concentration of black ink and the ink concentration of pigment ink.

As shown in FIG. 2, the detection unit 58 includes a first detection section 59 and a second detection section 60. The first detection section 59 is configured to detect the ink concentration of black ink. That is, the first detection section 59 detects the ink concentration of black ink among pigment inks of each color used by the recording section 12. The second detection section 60 is configured to detect the ink concentration of pigment ink. That is, the second detection section 60 detects the ink concentration of pigment inks of a plurality of colors used by the recording section 12.

The first detection section 59 and the second detection section 60 detect the ink concentration of washing liquid stored in the storage section 35. For example, the first detection section 59 and the second detection section 60 detect the ink concentration of washing liquid flowing through the first connection flow path 40. In this case, the first detection section 59 and the second detection section 60 detect the ink concentration of washing liquid flowing out from the washing tank 36. Therefore, the first detection section 59 and the second detection section 60 can accurately detect the ink concentration of washing liquid used for washing the transport belt 25. The first detection section 59 and the second detection section 60 may detect the ink concentration of washing liquid flowing through the second connection flow path 41.

The first detection section 59 and the second detection section 60 are optical sensors. The first detection section 59 and the second detection section 60 each include a light emitting section and a light receiving section. Specifically, the first detection section 59 includes a first light emitting section 61 and a first light receiving section 62. The second detection section 60 includes a second light emitting section 63 and a second light receiving section 64. The light emitting section includes a light emitting element. The light emitting section includes, for example, an LED. The light emitting section emits light of a predetermined wavelength. The light receiving section includes an element that outputs a signal by receiving light. The light receiving section includes, for example, a photodiode. The light receiving section receives light emitted by the light emitting section. The first light receiving section 62 receives light from the first light emitting section 61. The second light receiving section 64 receives light from the second light emitting section 63.

In order to detect the ink concentration of black ink, the first detection section 59 uses light of a wavelength at which black ink shows absorbency and the other inks do not show absorbency. For example, the first light emitting section 61 emits infrared light having the wavelength of 850 nm. The first light receiving section 62 receives the transmitted light. As a result, the first detection section 59 detects the ink concentration of black ink.

In order to detect the ink concentration of pigment ink including a plurality of colors, the second detection section 60 uses light having a wavelength at which pigment ink of a plurality of colors does not show absorbency. For example, the second light emitting section 63 emits infrared light having the wavelength of 850 nm, similarly to the first light emitting section 61. The second light receiving section 64 receives the scattered light. As a result, the second detection section 60 detects the ink concentration of pigment ink. The first light emitting section 61 and the second light emitting section 63 may be configured by a common LED.

The first detection section 59 detects the ink concentration of washing liquid flowing through the first flow path portion 43. The first light emitting section 61 emits light toward the first flow path portion 43. The light is reflected by the reflection sheet 45 and then enters the first light receiving section 62. As a result, the first detection section 59 detects transmitted light. Due to the reflection sheet 45, it is not necessary to cause the first light emitting section 61 and the first light receiving section 62 to face each other over the first flow path portion 43. That is, the first light emitting section 61 and the first light receiving section 62 do not need to be positioned so as to sandwich the first flow path portion 43. For example, the first light emitting section 61 and the first light receiving section 62 are arranged along the first flow path portion 43. In this way, the degree of freedom of positions of the first light emitting section 61 and the first light receiving section 62 is improved by the reflection sheet 45. Since the width of the first flow path portion 43 is relatively small, an optical path from the first light emitting section 61 to the first light receiving section 62 is small. As a result, the first detection section 59 can detect a large transmitted light amount. Therefore, the first detection section 59 can accurately detect the ink concentration of black ink.

The second detection section 60 detects the ink concentration of washing liquid flowing through the second flow path portion 44. The second light emitting section 63 and the second light receiving section 64 are arranged along the second flow path portion 44. The second light emitting section 63 emits light toward the second flow path portion 44. The light is diffused in washing liquid and then enters the second light receiving section 64. As a result, the second detection section 60 detects scattered light. Due to the light absorption sheet 46, light is less likely to be reflected by an outer peripheral surface of the second flow path portion 44. That is, it is difficult for reflected light to enter the second light receiving section 64. Therefore, the second detection section 60 can accurately detect scattered light. Since the width of the second flow path portion 44 is relatively large, light emitted from the second light emitting section 63 is easily diffused by pigment in washing liquid. As a result, the second detection section 60 can detect a large scattered light amount. Therefore, the second detection section 60 can accurately detect the ink concentration of pigment ink.

As shown in FIG. 1, the washing mechanism 31 includes a washing control section 65. The washing control section 65 controls the washing mechanism 31. Similarly to the recording control section 15, the washing control section 65 may be configured by a processor, may be configured by a hardware circuit, or may be configured by a circuit including a combination of a processor and a hardware circuit. The washing mechanism 31 may be controlled by the recording control section 15.

The washing control section 65 determines a threshold of the scattered light amount based on the ink concentration of black ink contained in washing liquid. That is, the washing control section 65 changes a threshold based on the ink concentration of black ink contained in washing liquid detected by the first detection section 59. The washing control section 65 determines whether or not washing liquid is contaminated by changing a threshold in accordance with the scattered light amount that varies depending on the ink concentration of black ink contained in washing liquid.

The washing control section 65 stores correspondence data D1. The correspondence data D1 is data in which the ink concentration of black ink and a threshold are associated with each other. The correspondence data D1 may be table data indicating the correspondence relationship between the ink concentration of black ink and a threshold, or may be function data for deriving a threshold from the ink concentration of black ink. The correspondence data D1 may be stored in the recording control section 15.

The washing control section 65 determines a threshold from a detection result of the first detection section 59 by referring to the correspondence data D1. For example, when the ink concentration of black ink is a first concentration, the washing control section 65 sets a first threshold. When the ink concentration of black ink is a second concentration, the washing control section 65 sets a second threshold. The washing control section 65 sets a threshold to be smaller as the ink concentration of black ink is larger.

The washing control section 65 determines whether or not to discharge washing liquid by comparing a detection result of the second detection section 60 with a threshold. When the ink concentration of pigment ink is equal to or larger than a threshold, the washing control section 65 discharges washing liquid from the storage section 35. At this time, the washing control section 65 discharges washing liquid from the storage section 35 by opening the third opening and closing valve 54. After completing discharge of washing liquid, the washing control section 65 supplies washing liquid to the storage section 35 by opening the second opening and closing valve 53. Thereby, washing liquid is replaced.

When discharging washing liquid, the washing control section 65 may determine whether or not the recording device 11 is recording. The washing control section 65 may determine whether or not the recording device 11 is recording by communicating with the recording control section 15. The washing control section 65 may determine whether or not the recording device 11 is recording by receiving an operation from a user. In a case where the recording device 11 is recording, it is desirable that washing liquid is stored in the washing tank 36. Therefore, when the recording device 11 is recording, the washing control section 65 discharges washing liquid from the accommodation tank 39 by opening the second opening and closing valve 53 in a state where the first opening and closing valve 52 is closed. Thus, while washing liquid is held in the washing tank 36, washing liquid is replaced in the accommodation tank 39.

Actions and Effects

Next, the actions and effects of the above-described embodiment will be described.

(1) The washing control section 65 determines a threshold based on the ink concentration of black ink. The washing control section 65 discharges washing liquid from the storage section 35 when the ink concentration of pigment ink is equal to or larger than a threshold. When the ink concentration of black ink contained in washing liquid is large, the scattered light amount received by the second detection section 60 is small. When the ink concentration of black ink contained in washing liquid is small, the scattered light amount received by the second detection section 60 is large. That is, even when the ink concentration of pigment ink contained in washing liquid is the same, when the ink concentration of black ink is different, the scattered light amount received by the second detection section 60 is different. Therefore, it is difficult to grasp the ink concentration of pigment ink based on the scattered light amount. In this regard, according to the above-described configuration, since a threshold is determined based on the ink concentration of black ink, even when the scattered light amount received by the second detection section 60 varies depending on the ink concentration of black ink, the ink concentration of pigment ink can be grasped based on the scattered light amount. Therefore, the washing mechanism 31 can appropriately discharge washing liquid based on the ink concentration.

(2) The first detection section 59 detects the ink concentration of black ink by the first light receiving section 62 receiving light transmitted through washing liquid. The second detection section 60 detects the ink concentration of pigment ink by the second light receiving section 64 receiving light scattered in washing liquid. Pigment of black ink absorbs light more easily than pigment other than black ink. Therefore, according to the above-described configuration, the first detection section 59 can detect the ink concentration of black ink based on the transmitted light amount of washing liquid. As a result, the washing control section 65 can appropriately determine a threshold.

(3) The width of the first flow path portion 43 is smaller than the width of the second flow path portion 44. In order to increase the transmitted light amount of washing liquid, it is desirable that the width of the first flow path portion 43 is small. In order to increase the scattered light amount of washing liquid, it is desirable that the width of the second flow path portion 44 is large. According to the above-described configuration, it is easy for the first detection section 59 to detect the ink concentration of black ink, and it is easy for the second detection section 60 to detect the ink concentration of pigment ink.

(4) The detection flow path 42 includes the reflection sheet 45 that reflects light by the first light emitting section 61 toward the first light receiving section 62. According to the above-described configuration, the first light receiving section 62 can receive transmitted light of washing liquid without arranging the first light emitting section 61 and the first light receiving section 62 so as to sandwich the first flow path portion 43. As a result, the first light emitting section 61 and the first light receiving section 62 can be collectively positioned in one place.

(5) The detection flow path 42 includes the light absorption sheet 46 that absorbs light by the second light emitting section 63. Light emitted by the second light emitting section 63 may be reflected by the second flow path portion 44. When the second light receiving section 64 receives the reflected light, the detection accuracy of the second detection section 60 decreases. In this regard, according to the above-described configuration, since reflected light is reduced by the light absorption sheet 46, the possibility that the detection accuracy of the second detection section 60 decreases is reduced.

(6) The washing mechanism 31 includes the pump 49 that circulates washing liquid between the washing tank 36 and the accommodation tank 39 through the first connection flow path 40 and the second connection flow path 41. According to the above-described configuration, since washing liquid is circulated, the ink concentration of pigment ink contained in washing liquid is likely to be uniform. Therefore, the detection accuracy of the first detection section 59 and the detection accuracy of the second detection section 60 are improved.

(7) The first detection section 59 detects the ink concentration of black ink contained in washing liquid flowing through the first connection flow path 40. The second detection section 60 detects the ink concentration of pigment ink contained in washing liquid flowing through the first connection flow path 40. In the washing tank 36, pigment ink is mixed into washing liquid. Therefore, the ink concentration of pigment ink contained in washing liquid flowing through the first connection flow path 40 is likely to be larger than the ink concentration of pigment ink contained in washing liquid flowing through the second connection flow path 41. The same applies to the ink concentration of black ink. Therefore, according to the above-described configuration, the detection accuracy of the t first detection section 59 and the detection accuracy of the second detection section 60 are improved.

(8) The washing control section 65 determines a threshold based on the ink concentration of black ink by referring to the correspondence data D1. According to the above-described configuration, the washing control section 65 can relatively easily determine a threshold.

Modifications

The above-described embodiment may be modified as follows. The above-described embodiments and the following modifications can be implemented in combination with each other to the extent that they are not technically contradictory.

Figure 8:
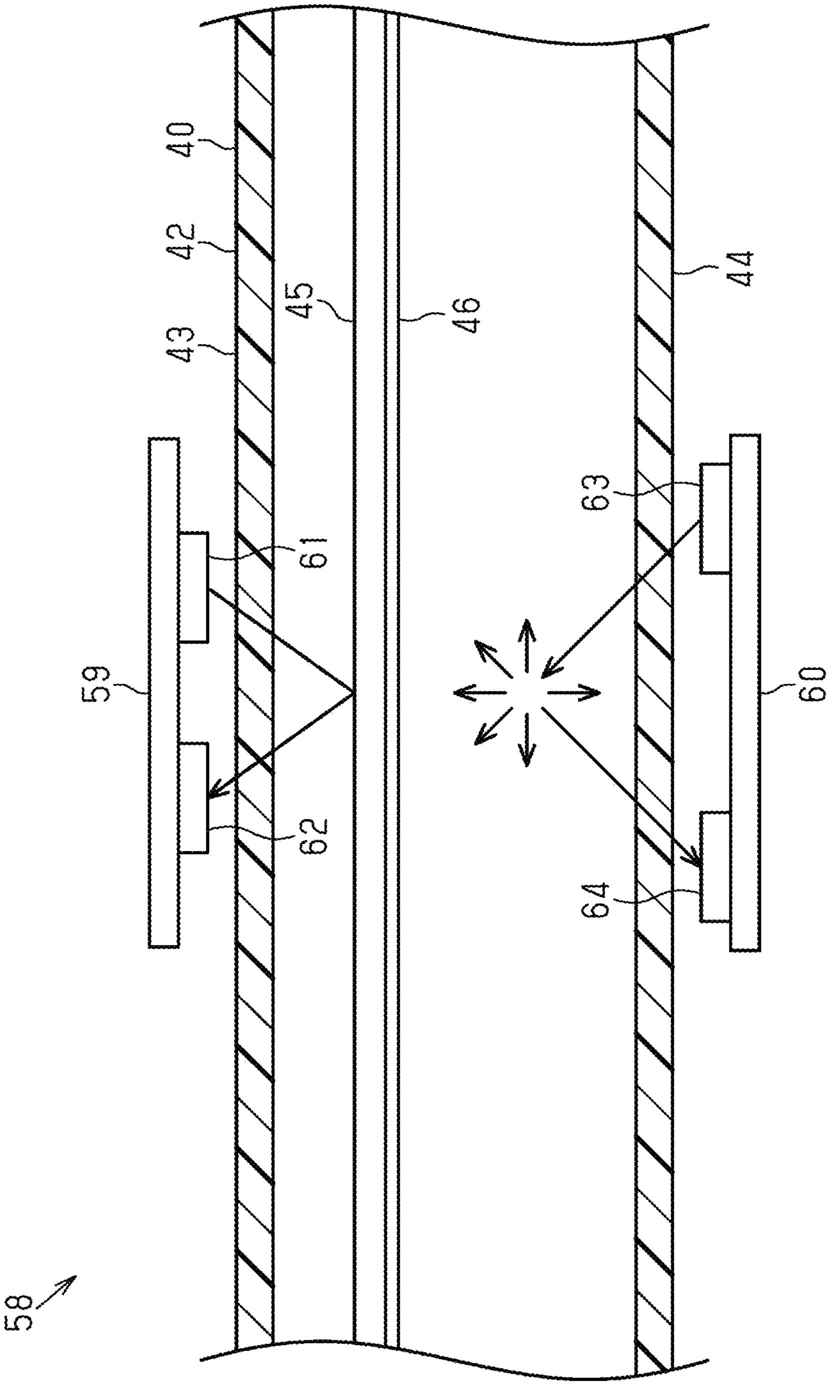
FIG. 8 is a schematic diagram showing a modification of a detection flow path.

As shown in FIG. 8, the reflection sheet 45 and the light absorption sheet 46 may be positioned in the first flow path portion 43 and the second flow path portion 44. In this modification, the reflection sheet 45 and the light absorption sheet 46 are positioned in the first flow path portion 43 and the second flow path portion 44 in a state of being bonded to each other. The reflection sheet 45 and the light absorption sheet 46 branch the detection flow path 42 into the first flow path portion 43 and the second flow path portion 44. The reflection sheet 45 and the light absorption sheet 46 define the first flow path portion 43 and the second flow path portion 44. The first flow path portion 43 is a portion of the detection flow path 42 that faces the reflection sheet 45. The second flow path portion 44 is a portion of the detection flow path 42 that faces the light absorption sheet 46. In this modification, the first detection section 59 and the second detection section 60 are positioned so as to sandwich the detection flow path 42.

The first detection section 59 and the second detection section 60 may detect washing liquid flowing through each of different connection flow paths. For example, the first detection section 59 may detect washing liquid flowing through the first connection flow path 40, while the second detection section 60 may detect washing liquid flowing through the second connection flow path 41. In this case, the first connection flow path 40 and the second connection flow path 41 each include the detection flow path 42.

The first detection section 59 is not limited to detecting the ink concentration of black ink by a transmission method. For example, the first detection section 59 may detect the ink concentration of black ink by detecting the pH of washing liquid. In this case, black ink contains a component that changes the pH of washing liquid. In addition, the first detection section 59 is not limited to the pH, and may detect the ink concentration of black ink by detecting a component included in black ink from washing liquid.

Liquid ejected by the recording section 12 is not limited to ink, and may be, for example, a liquid material in which particles of a functional material are dispersed or mixed in liquid. For example, the recording section 12 may eject a liquid material containing a material such as an electrode material or a pixel material used for manufacturing a liquid crystal display, an electroluminescent display, a surface emitting display, or the like in a dispersed or dissolved form.

Technical Ideas

Hereinafter, technical ideas grasped from the above-described embodiments and modifications, and actions and effects thereof, will be described.

(A) A recording device includes a transport belt configured to transport a medium; a recording section configured to record an image on a medium transported by the transport belt by ejecting pigment ink onto the medium; and a washing mechanism configured to wash the transport belt with washing liquid, wherein the pigment ink includes black ink and ink other than the black ink, the washing mechanism includes a storage section configured to store washing liquid, a first detection section configured to detect an ink concentration of the black ink contained in washing liquid stored in the storage section, a second detection section configured to detect an ink concentration of the pigment ink contained in the washing liquid stored in the storage section, and a washing control section, the second detection section detects the ink concentration of the pigment ink by receiving light scattered in the washing liquid, and the washing control section determines a threshold based on the ink concentration of the black ink detected by the first detection section, and discharges washing liquid from the storage section when the ink concentration of the pigment ink detected by the second detection section is equal to or larger than the threshold.

When the ink concentration of black ink contained in washing liquid is large, the scattered light amount received by the second detection section is small. When the ink concentration of black ink contained in washing liquid is small, the scattered light amount received by the second detection section is large. That is, even when the ink concentration of pigment ink contained in washing liquid is the same, when the ink concentration of black ink is different, the scattered light amount received by the second detection section is different. Therefore, it is difficult to grasp the ink concentration of pigment ink based on the scattered light amount. In this regard, according to the above-described configuration, since a threshold is determined based on the ink concentration of black ink, even when the scattered light amount received by the second detection section varies depending on the ink concentration of black ink, the ink concentration of pigment ink can be grasped based on the scattered light amount. Therefore, the washing mechanism can properly discharge washing liquid based on the ink concentration.

(B) The recording device may be configured such that the first detection section includes a first light emitting section configured to emit light and a first light receiving section configured to receive the light emitted from the first light emitting section, and detects the ink concentration of the black ink by receiving light transmitted through the washing liquid by the first light receiving section and the second detection section includes a second light emitting section configured to emit light and a second light receiving section configured to receive the light emitted from the second light emitting section, and detects the ink concentration of the pigment ink by receiving light scattered in the washing liquid by the second light receiving section.

Pigment of black ink absorbs light more easily than pigment other than black ink. Therefore, according to the above-described configuration, the first detection section can detect the ink concentration of black ink based on the transmitted light amount of washing liquid. Thereby, the washing control section can appropriately determine a threshold.

(C) The recording device may be configured such that the storage section includes a detection flow path through which washing liquid flows, the detection flow path includes a first flow path portion in which an ink concentration is detected by the first detection section and a second flow path portion in which an ink concentration is detected by the second detection section, and a width of the first flow path portion is smaller than a width of the second flow path portion.

In order to increase the transmitted light amount of washing liquid, it is desirable that the width of the first flow path portion is small. In order to increase the scattered light amount of washing liquid, it is desirable that the width of the second flow path portion is large. According to the above-described configuration, it is easy for the first detection section to detect the ink concentration of black ink, and it is easy for the second detection section to detect the ink concentration of pigment ink.

(D) The recording device may be configured such that the storage section includes a detection flow path through which washing liquid flows, the detection flow path includes a first flow path portion in which an ink concentration is detected by the first detection section, a second flow path portion in which an ink concentration is detected by the second detection section, and a reflection sheet that reflects the light emitted from the first light emitting section toward the first light receiving section, and the first light emitting section and the first light receiving section are arranged along the first flow path portion.

According to the above-described configuration, the first light receiving section can receive transmitted light of washing liquid without arranging the first light emitting section and the first light receiving section so as to sandwich the first flow path portion. Thereby, the first light emitting section and the first light receiving section can be collectively positioned in one place.

(E) The recording device may be configured such that the storage section includes a detection flow path through which washing liquid flows, the detection flow path includes a first flow path portion in which an ink concentration is detected by the first detection section, a second flow path portion in which an ink concentration is detected by the second detection section, and a light absorption sheet that absorbs the light emitted by the second light emitting section, and the second light emitting section and the second light receiving section are arranged along the second flow path portion.

Light emitted by the second light emitting section may be reflected by the second flow path portion. When the second light receiving section n receives the reflected light, the detection accuracy of the second detection section decreases. In this regard, according to the above-described configuration, since reflected light is reduced by the light absorption sheet, the possibility that the detection accuracy of the second detection section decreases is reduced.

(F) The recording device may be configured such that the storage section includes a washing tank, an accommodation tank, a first connection flow path connected to the washing tank and the accommodation tank, and a second connection flow path connected to the washing tank and the accommodation tank and the washing mechanism includes a washing section configured to wash the transport belt with washing liquid stored in the washing tank, and a pump configured to circulate washing liquid between the washing tank and the accommodation tank through the first connection flow path and the second connection flow path.

According to the above-described configuration, since washing liquid is circulated, the ink concentration of pigment ink contained in washing liquid is likely to be uniform. Therefore, the detection accuracy of the first detection section and the detection accuracy of the second detection section are improved.

(G) The recording device may be configured such that the pump sends washing liquid from the washing tank to the accommodation tank through the first connection flow path, and sends washing liquid from the accommodation tank to the washing tank through the second connection flow path, the first detection section detects the ink concentration of the black ink contained in washing liquid flowing through the first connection flow path, and the second detection section detects the ink concentration of the pigment ink contained in washing liquid flowing through the first connection flow path.

In the washing tank, pigment ink is mixed into washing liquid. Therefore, the ink concentration of pigment ink contained in washing liquid flowing through the first connection flow path is likely to be larger than the ink concentration of pigment ink contained in washing liquid flowing through the second connection flow path. The same applies to the ink concentration of black ink. Therefore, according to the above-described configuration, the detection accuracy of the first detection section and the detection accuracy of the second detection section are improved.

(H) The recording device may be configured such that the washing control section stores correspondence data in which the ink concentration of the black ink and the threshold are associated with each other, and determines the threshold based on the ink concentration of the black ink by referring to the correspondence data.

According to the above-described configuration, the washing control section can relatively easily determine a threshold.

(I) A washing mechanism for washing, with washing liquid, a transport belt that transports a medium on which an image is recorded by ejecting pigment ink containing black ink and ink other than the black ink, the washing mechanism includes a storage section configured to store washing liquid; a first detection section configured to detect an ink concentration of the black ink contained in washing liquid stored in the storage section; a second detection section configured to detect an ink concentration of the pigment ink contained in washing liquid stored in the storage section; and a washing control section, wherein the second detection section detects the ink concentration of the pigment ink by receiving light scattered in washing liquid and the washing control section determines a threshold based on the ink concentration of the black ink detected by the first detection section, and discharges washing liquid from the storage section when the ink concentration of the pigment ink detected by the second detection section is equal to or larger than the threshold.

According to the above-described configuration, the same effect as that of the recording device can be obtained.

What is claimed is:

1. A recording device comprising:

a transport belt configured to transport a medium;

a recording section configured to record an image on a medium transported by the transport belt by ejecting pigment ink onto the medium; and a washing mechanism configured to wash the transport belt with washing liquid, wherein the pigment ink includes black ink and ink other than the black ink, the washing mechanism includes a storage section configured to store washing liquid, a first detection section configured to detect an ink concentration of the black ink contained in washing liquid stored in the storage section, the first detection section includes a first light emitting section configured to emit light and the first detection section detects the ink concentration of the black ink by receiving light transmitted through the washing liquid, the second detection section includes a second light emitting section configured to emit light and a second detection section configured to detect an ink concentration of the pigment ink contained in the washing liquid stored in the storage section, and a washing control section, the second detection section detects the ink concentration of the pigment ink by receiving light scattered in the washing liquid, and the washing control section determines a threshold based on the ink concentration of the black ink detected by the first detection section, and discharges washing liquid from the storage section when the ink concentration of the pigment ink detected by the second detection section is equal to or larger than the threshold.

2. The recording device according to claim 1, wherein the first detection section includes a first light receiving section configured to receive the light emitted from the first light emitting section, and the second detection section includes a second light emitting section configured to emit light and a second light receiving section configured to receive the light emitted from the second light emitting section.

3. The recording device according to claim 2, wherein the storage section includes a detection flow path through which washing liquid flows, the detection flow path includes a first flow path portion in which an ink concentration of black ink is detected by the first detection section and a second flow path portion in which an ink concentration of the pigment ink is detected by the second detection section, and a width of the first flow path portion is smaller than a width of the second flow path portion.

4. The recording device according to claim 2, wherein the storage section includes a detection flow path through which washing liquid flows, the detection flow path includes a first flow path portion in which an ink concentration of black ink is detected by the first detection section, a second flow path portion in which an ink concentration of the pigment ink is detected by the second detection section, and a reflection sheet that reflects the light emitted from the first light emitting section toward the first light receiving section, and the first light emitting section and the first light receiving section are arranged along the first flow path portion.

5. The recording device according to claim 2, wherein the storage section includes a detection flow path through which washing liquid flows, the detection flow path includes a first flow path portion in which an ink concentration of black ink is detected by the first detection section, a second flow path portion in which an ink concentration of the pigment ink is detected by the second detection section, and a light absorption sheet that absorbs the light emitted by the second light emitting section, and the second light emitting section and the second light receiving section are arranged along the second flow path portion.

6. The recording device according to claim 1, wherein the storage section includes a washing tank, an accommodation tank, a first connection flow path connected to the washing tank and the accommodation tank, and a second connection flow path connected to the washing tank and the accommodation tank and the washing mechanism includes a washing section configured to wash the transport belt with washing liquid stored in the washing tank, and a pump configured to circulate washing liquid between the washing tank and the accommodation tank through the first connection flow path and the second connection flow path.

7. The recording device according to claim 6, wherein the pump sends washing liquid from the washing tank to the accommodation tank through the first connection flow path, and sends washing liquid from the accommodation tank to the washing tank through the second connection flow path, the first detection section detects the ink concentration of the black ink contained in washing liquid flowing through the first connection flow path, and the second detection section detects the ink concentration of the pigment ink contained in washing liquid flowing through the first connection flow path.

8. The recording device according to claim 1, wherein the washing control section stores correspondence data in which the ink concentration of the black ink and the threshold are associated with each other, and determines the threshold based on the ink concentration of the black ink by referring to the correspondence data.

9. A washing mechanism for washing, with washing liquid, a transport belt that transports a medium on which an image is recorded by ejecting pigment ink containing black ink and ink other than the black ink, the washing mechanism comprising:

a storage section configured to store washing liquid;

a first detection section configured to detect an ink concentration of the black ink contained in washing liquid stored in the storage section;

the first detection section includes a first light emitting section configured to emit light and the first detection section detects the ink concentration of the black ink by receiving light transmitted through the washing liquid, the second detection section includes a second light emitting section configured to emit light and a second detection section configured to detect an ink concentration of the pigment ink contained in washing liquid stored in the storage section; and a washing control section, wherein the second detection section detects the ink concentration of the pigment ink by receiving light scattered in washing liquid and the washing control section determines a threshold based on the ink concentration of the black ink detected by the first detection section, and discharges washing liquid from the storage section when the ink concentration of the pigment ink detected by the second detection section is equal to or larger than the threshold.

* * * * *